Oct. 29, 1963 K. TOMLINSON 3,108,317
FINGERS FOR REMOVING FEATHERS FROM POULTRY
Filed Jan. 26, 1961
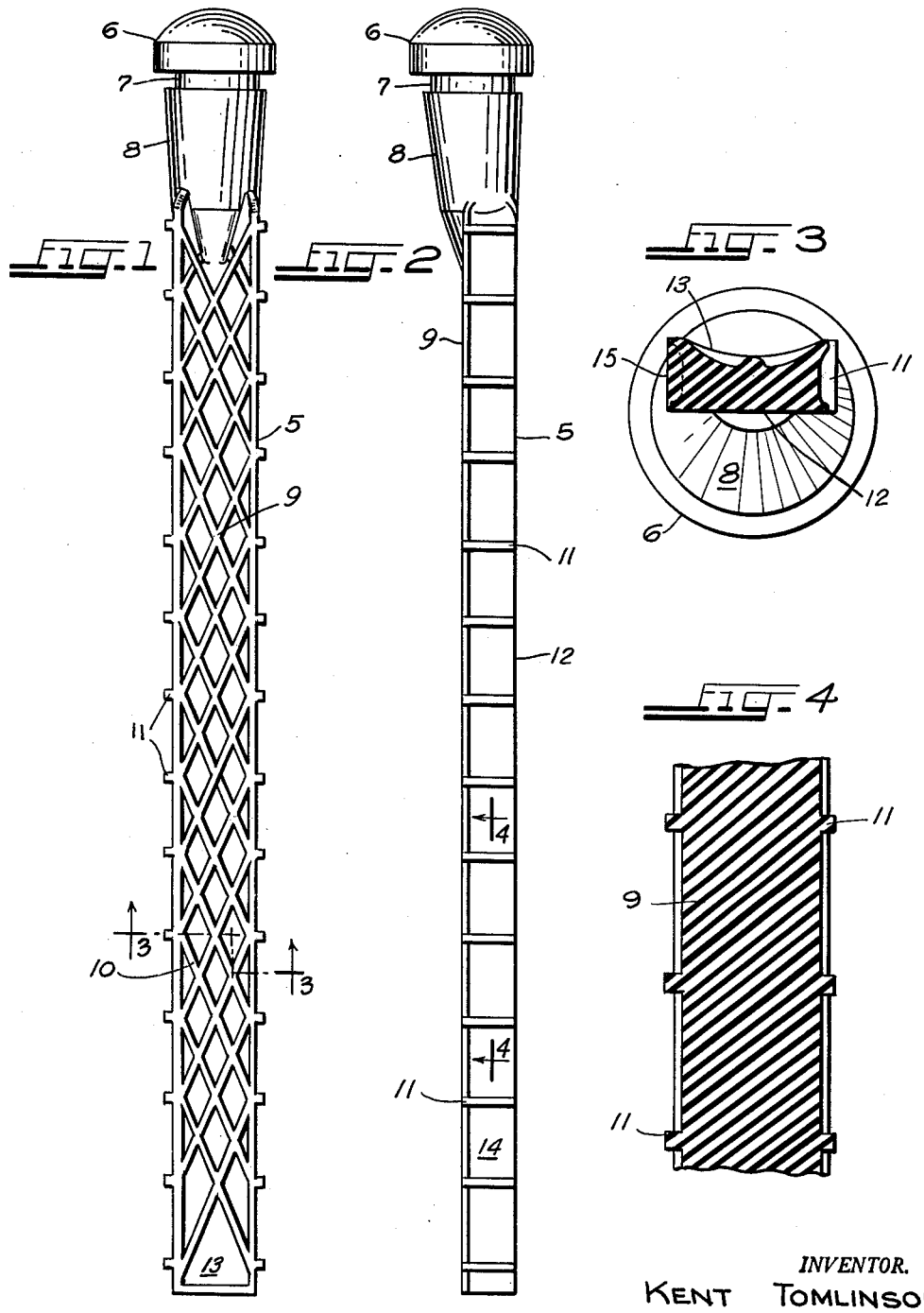
INVENTOR.
KENT TOMLINSON
BY
J. Warren McCaffrey
ATTY.

3,108,317
FINGERS FOR REMOVING FEATHERS FROM POULTRY
Kent Tomlinson, 8316 S. Langley Ave., Chicago, Ill.
Filed Jan. 26, 1961, Ser. No. 85,131
5 Claims. (Cl. 17—11.1)

This invention relates to improved picking fingers for use in connection with automatic fowl feather picking machines.

The new picking finger of this invention is made of resilient material, such as rubber or rubber-like material including plasticols and other plastic materials, and especially polyvinyl chloride.

The picking finger of this invention is molded as a unitary article consisting of a mounting head contiguous to a shank section and an elongated feather-picking section which is a continuation of aforesaid shank section.

In commercial processing of fowl the feathers are customarily removed by a plurality of radially-extending fingers which are mounted on the outside of two drums that revolve oppositely while the fowl is being defeathered and passes between the aforesaid drums in a manner that permits said radially-extending fingers to brush through the feathers of the fowl and thereby remove them. The principal object of the operation is to completely remove the feathers and not to remove or damage the skin of the fowl.

It is an object of this invention to provide a feather-picking finger of novel construction which can be used in automatic picking machines of the type described.

The device of this invention consists in the construction, arrangement and combination of the various elements comprising the unitary article whereby the object stated and others are attained as more fully set forth herein, covered in the appended claims, and illustrated in the accompanying drawings, wherein—

FIG. 1 is a top plan view of the novel picking finger of this invention.

FIG. 2 is a side elevational view of the same picking finger.

FIG. 3 is a transverse, sectional view on an enlarged scale taken along irregular line 3—3 of FIG. 1.

FIG. 4 is a longitudinal, sectional view on an enlarged scale taken along the line 4—4 of FIG. 2.

With reference to the drawings identical elements are identified by the same numerals in the different views in which 5 represents the finger generally. The mounting head 6 has a recessed collar 7 for attaching finger 5 to the drum of the machine not shown. The shank 8 tapers slightly from the head portion 6 to the feather-picking section 9.

The feather-picking section 9 especially features the picking finger of this invention. It comprises an elongated finger that has four sides one of which is smooth and flat which we will refer to as the back 12. The opposite side we will call the face 13 and it is clearly shown in the top plan view of FIGURE 1. The two narrower sides of the finger are 14, shown in FIG. 2, and 15, shown in FIG. 3. The front face 13 is slightly concave as appears in FIGURE 3. It has raised strips 10 arranged diagonally throughout the length and width of the front face. The strips 10 are raised high enough above the concave surface of the face to form a corrugated surface. In the picking operation the diagonal strips act much like ribs on other types of picking fingers.

As a special feature of this invention where the raised strips meet the other two narrower sides there are a series of ribs 11 extending transverse to the length of the feather-picking section 9. The narrower two sides 14 and 15 have a slightly concave surface also, as shown in the transverse sectional view in FIGURE 3. The series of ribs 11 and the diagonally-arranged raised strips 10 are very effective in the combined whipping and wiping action of the corrugated and ribbed surfaces in removing feathers from the poultry being processed.

It is within the scope of this invention that the drums on which the feather picking fingers of this invention are mounted, and between which the fowl are passed suspended from a shackle moving along a track, may be rotated clockwise or counter-clockwise as desired. However, each pair of drums that have their fingers simultaneously brushing the suspended fowl must be rotated in opposite directions so that the fingers at any one time are brushing the feathers either down or up. Of course, when the fingers are brushing the feathers upward then the fowl must be fastened down by an attachment to the fowl's lower extremities to keep the rotating fingers from brushing the fowl up in the air.

It is a feature of this invention that the fingers be mounted on rotating drums always so that the front or top face containing the criss-crossed elevated strips brushes against the passing fowl in a manner to whip or brush the feathers off the carcass of the fowl. To have the flat or rear face 12 of the finger of the invention brush the feathers of the passing fowl would have a negligible effect.

Whether the fingers of this invention are brushed through the feathers of the suspended fowl by a rotating downward or upward stroke the equally-spaced ribs along the two narrow concave sides will effectively assist in picking or plucking the feathers from the carcass of the suspended fowl.

The fingers of this invention may be molded out of rubber, rubber-like or plastic materials. Controlled resiliency of the fingers can be had by molding them out of polyvinyl chloride which is a rubber-like plastic material.

On the narrower sides of the finger of this invention there are two features of construction that will increase the picking efficiency. In the first place the narrower sides have concave surfaces, and secondly there is a uniformly-spaced series of ribs along said narrower concave sides which run at right angles to the front and back surfaces of the finger.

I claim:

1. A finger for removing feathers from poultry when used with similar fingers so as to brush off the feathers consisting of an elongated finger-like element made out of rubber-like material, said finger having two broader oppositely-disposed sides and two much narrower oppositely-disposed sides, one of said broader sides having a smooth, flat face, and said two oppositely-disposed narrower sides having slightly concave faces, and said fourth side having a concave face with elevated strips diagonally crossed on said concave surface, and where said elevated strips meet the juncture of said broad concave surface with said narrower concave surfaces having elevated strips across the narrower concave surfaces at right angles to said juncture of aforesaid concave surfaces.

2. A feather picking finger of the class described comprising a mounting head, a tapered shank and a feather picking section, said latter section comprising an elongated four-sided finger having two oppositely-disposed narrow concave-shaped sides, and two oppositely disposed wider sides, one of said wider sides having a flat back surface, and the other oppositely disposed wider side, which is the front surface of said finger, having a concave surface, and said front concave surface having elevated ribs thereon extending completely across said front surface from one narrow side to the opposite narrow side in a criss-cross diamond-shaped pattern.

3. A feather picking finger as claimed in claim 2, said two narrow concave sides having a series of ribs transverse and equally spaced along each side of said feather picking section and meeting the elevated ribs on the front surface where they terminate at the joining edges of said narrow sides and said front surface.

4. A feather picking finger of the class described comprising a mounting head connected to one end of the feather picking element by a tapered shank, said head, shank and feather picking element being made from rubber-like material and flexible, and said feather picking element consisting of an elongated four sided finger having two oppositely disposed narrow concave sides and two oppositely disposed wider sides, one of said wider sides having a flat back surface, and the other oppositely disposed wider side, which is the front surface of said finger, having a concave surface and having a series of diagonally crossed elevated ribs spaced along said concave front surface and extending from one side to the opposite side of said front surface.

5. A feather picking finger as claimed in claim 4 above, and said two narrow concave sides having a series of ribs transverse and equally spaced along each narrow side of said feather picking section, which ribs meet the diagonally crossed elevated ribs at the edges where the front concave surface meets the oppositely disposed narrow concave side surfaces of the finger.

References Cited in the file of this patent

UNITED STATES PATENTS

| | | |
|---|---|---|
| 2,469,345 | Toti et al. | May 3, 1949 |
| 2,559,001 | Barker | July 3, 1951 |
| 2,562,681 | Pine | July 31, 1951 |
| 2,759,318 | Oppel | Aug. 21, 1956 |